United States Patent [19]

Wilson et al.

[11] Patent Number: 4,781,609

[45] Date of Patent: Nov. 1, 1988

[54] WALL SYSTEM WITH MULTICIRCUIT ELECTRICAL SYSTEM

[75] Inventors: Harold R. Wilson, Holland; David E. Nestell, Grand Rapids, both of Mich.

[73] Assignee: Haworth, Inc., Holland, Mich.

[21] Appl. No.: 906,556

[22] Filed: Sep. 8, 1986

Related U.S. Application Data

[63] Continuation of Ser. No. 639,970, Aug. 10, 1984, abandoned.

[51] Int. Cl.$^4$ ............................................. H01R 29/00
[52] U.S. Cl. .................................... 439/215; 439/174; 439/210
[58] Field of Search ...................... 339/20, 21 R, 22 R, 339/22 B, 23, 24; 174/48, 68; 439/110, 120, 121, 171, 174, 207, 209, 210, 215

[56] References Cited

U.S. PATENT DOCUMENTS

| | | |
|---|---|---|
| 1,870,762 | 8/1932 | Winter . |
| 3,832,503 | 8/1974 | Crane . |
| 3,993,385 | 11/1976 | Seger ................... 339/21 R |
| 4,108,523 | 8/1978 | Bolis . |
| 4,367,370 | 1/1983 | Wilson et al. ............ 174/48 |
| 4,382,648 | 5/1983 | Propst et al. . |
| 4,429,934 | 2/1984 | Vanden Hoek et al. ......... 339/22 R |
| 4,494,808 | 1/1985 | Widell et al. ............ 339/21 R |
| 4,666,223 | 5/1987 | Tillmann ..................... 339/32 R |

FOREIGN PATENT DOCUMENTS

2315786 1/1977 France .
2371803 6/1978 France .

*Primary Examiner*—Eugene F. Desmond
*Attorney, Agent, or Firm*—Flynn, Thiel, Boutell & Tanis

[57] ABSTRACT

An electrical system for a wall system formed from a plurality of serially connected wall panels. Each panel has at least one electrical terminal mounted thereon, and the terminals are joined by electrical cables or flexible electrical connectors. The electrical system is a seven-conductor system employing three live and three neutral conductors for defining three separate electrical circuits each having a separate neutral. A portable power-tap unit, specifically a receptacle unit, can be plugged into the power block for selective engagement with any one of the three circuits. The power-tap unit has a connector portion which plugs into the power block, which connector portion is defined soley by three contacts. Two of the three contacts, namely the live and neutral contacts, are mounted on a carrier which is slidably supported on the power-tap housing so as to be slidably displaced between three selected positions so that the power-tap can be selectively joined to any one of the three circuits.

12 Claims, 4 Drawing Sheets

WALL SYSTEM WITH MULTICIRCUIT ELECTRICAL SYSTEM

This application is a continuation of U.S. Ser. No. 639,970, filed Aug. 10, 1984, now abandoned.

FIELD OF THE INVENTION

This invention relates to a wall system formed from a plurality of series-connected electrically prewired panels having removable power-taps and, more specifically, to an improved seven-wire, three-circuit electrical system having an improved circuit-selectable power-tap.

BACKGROUND OF THE INVENTION

U.S. Pat. No. 4,367,370, owned by the assignee of this application, discloses a wall system formed from a plurality of series-connected electrically prewired panels, and more specifically to a wall system wherein power-taps such as for light fixtures and conventional electrical receptacles can be selectively positioned on the panels and selectively switchably connected, at their point of use, to any one of a plurality of different electrical circuits. The wall system of the aforesaid panel is provided with a five-wire electrical system (three live, one neutral, and one ground wire) which defines three different electrical circuits extending along the wall system. A switchable power-tap is removably connected to a power block or terminal associated with the panels to permit circuit selection at the point of use. The power-tap is provided with a plug-in connection for engagement with the power block or terminal. Irrespective of which circuit the power-tap is connected to, however, the power-tap always connects to the same "neutral" wire since the power-tap permits selection only between the three different "live" wires.

The electrified wall system of the aforesaid patent, and specifically the switchable power-tap associated therewith, has proven highly desirable in its ability to permit a circuit-selecting function to be performed at each individual point of use. However, in a continuing effort to improve upon the design, simplicity, function, performance and reliability of the electrical system and of the power-taps associated therewith, specifically when the power-tap comprises a receptacle unit, the improved electrical system and circuit-selectable power-tap of this invention has been developed.

More specifically, this invention relates to an improved electrical system for a wall system formed from interconnected prewired wall panels, which electrical system is a seven-wire system formed by three live, three neutral and one ground wires. Each of the three circuits as defined by a respective one of the "live" wires has a dedicated "neutral". This thus significantly minimizes the noise or intermittent current as transmitted over the "neutral", such as due to phase shifting caused by inductive loads when several circuits share a common neutral, and hence makes the system more desirable for use with sensitive equipment such as computers and the like.

In the improved electrical system of this invention, there is provided an improved circuit-selectable power-tap which permits selection of any one of the three available circuits directly at the point of use, namely at the point of connection of the power-tap to the power block. The power-tap, which in a preferred form comprises a conventional receptacle unit, is provided solely with three contacts as prongs which create a plug-in type connection with the respective panel-mounted power block. These three contacts, as is conventional, constitute the "hot", "neutral" and "ground". However, the "hot" and "neutral" contacts, while being electrically isolated from one another, are mounted on a common insulative carrier which itself is movably, preferably slidably, mounted on the power-tap housing. This carrier and the "hot" and "neutral" contacts mounted thereon can hence be manually slidably displaced into three discrete positions which correspond to the three circuits defined in the power block. The carrier can be movably displaced only when the power-tap is disconnected from the power block. By initially positioning the carrier in one of the three available positions, the "live" and "neutral" contacts of the power-tap can be electrically engaged with any one of the selected circuits associated with the power block.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the panel and designated components. Said terminology will include the words specifically mentioned, derivatives thereof, and words of similar meaning.

DETAILED DESCRIPTION

Figures 1, 4:
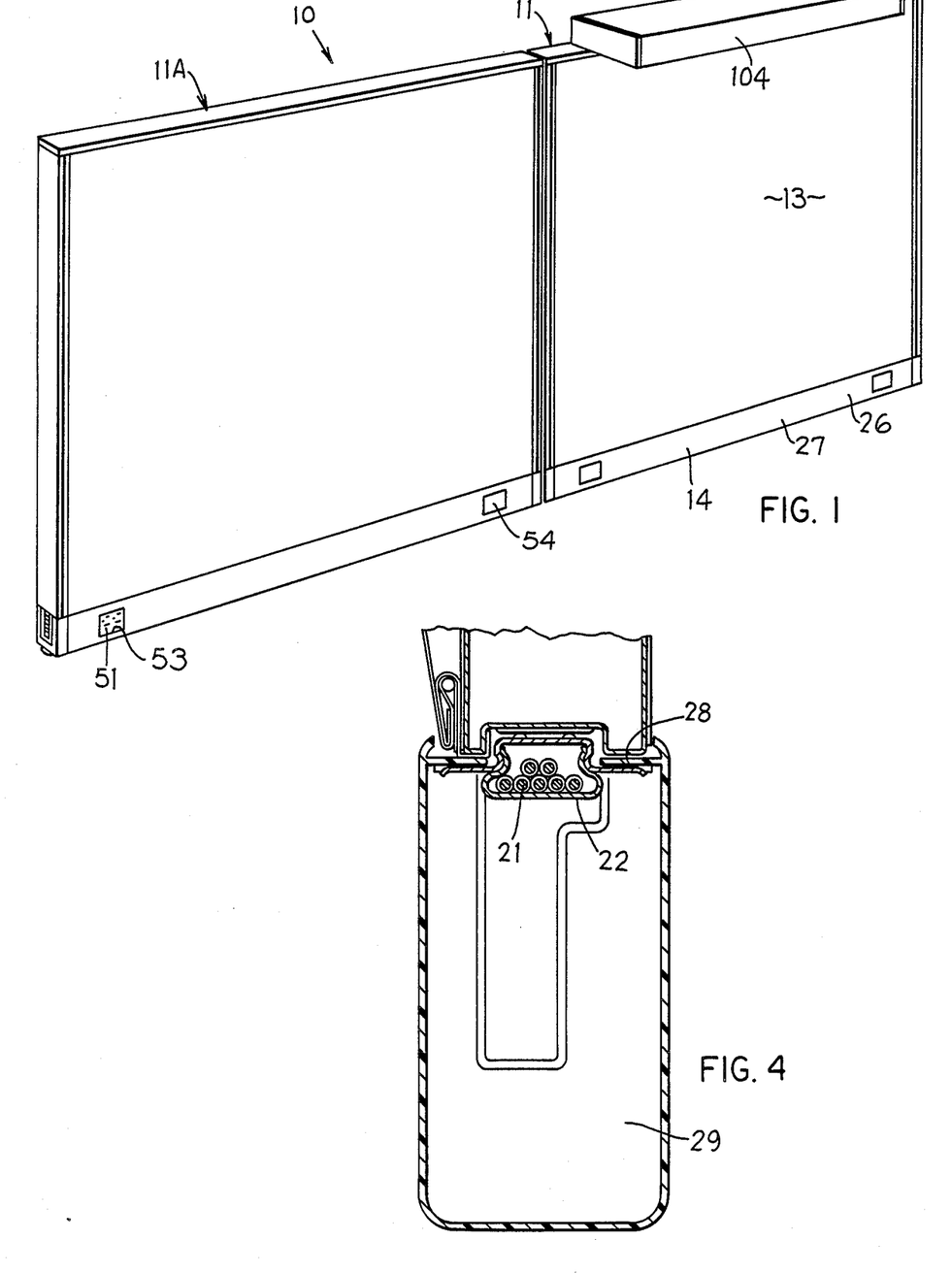
FIG. 1 is a perspective view illustrating a wall system formed from two series-connected panels which are electrically prewired.
FIG. 4 is a cross-sectional view through the bottom raceway and illustrating the cover arrangement.

FIG. 1 illustrates a wall system 10 formed from a series of interconnected upright prefabricated panels, only two substantially identical panels 11 and 11A being illustrated. Panels of different lengths can be serially interconnected.

Figure 2:
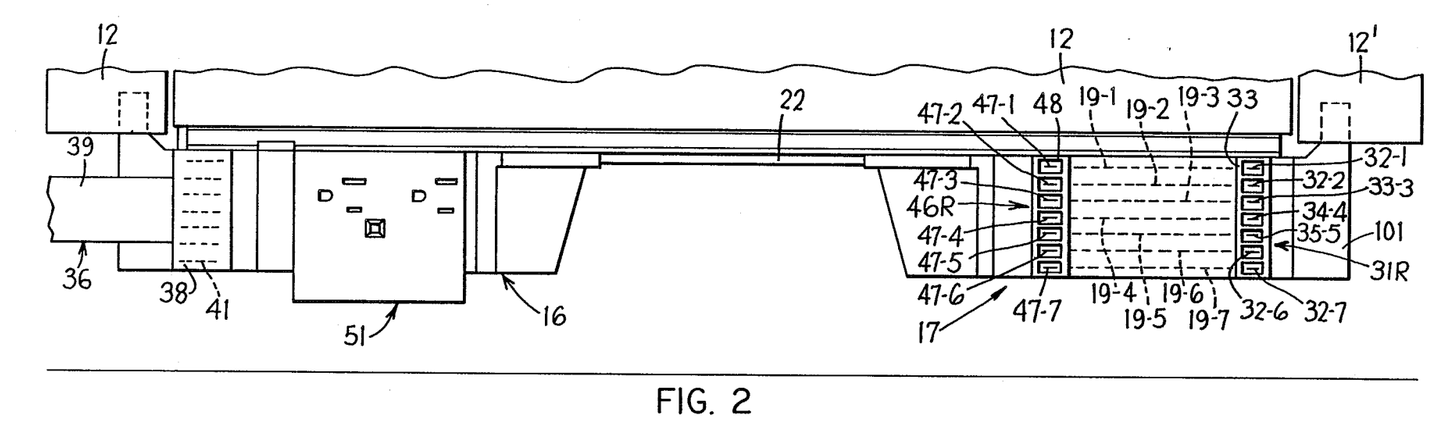
FIG. 2 is an enlarged, fragmentary side view illustrating the prewired raceway, with cover removed, as associated with the lower edge of the panel.

Each panel, such as panel 11A, includes an internal rigid rectangular frame formed by parallel top and bottom rails rigidly joined together by parallel side rails, the bottom rail 12 and side rails 12' being partially illustrated in FIG. 2. These rails are of channel-shaped configuration and open inwardly of the panel, whereby the frame confines therein a suitable core structure, such as a honeycomb layer or similar conventional structure. The core and frame are normally sandwiched between thin facing sheets disposed on opposite sides of the frame, which sheets in turn are normally covered by a suitable fabric, the latter defining the exterior side surfaces 13 of the panel. The structure of panel 11 is well known, and one such structure is disclosed in U.S. Pat. No. 4,060,294, which patent also discloses the L-shaped plastic hinge used for hingedly connecting the adjacent vertical edges of two panels together.

The panel 11 (as well as panel 11A) is provided with a prewired electrical system 14 extending longitudinally along the lower edge thereof, which system includes identical power blocks or terminals 16 and 17 disposed adjacent the opposite lower corners of the panel, as illustrated in FIG. 2. The power blocks 16 and 17 each include a blocklike housing 18 constructed of an electrically insulative material and supporting therein a plurality of electrically conductive plates 19 which are electrically insulated from one another. The system of this invention comprises a seven-wire system, and hence each power block mounts therein seven electrically conductive plates which are only diagrammatically illustrated in FIG. 2 and are designated as 19-1 through 19-7. The seven conductive plates 19 of power blocks 16 and 17 are individually electrically connected by seven wire conductors 21 which extend between the power blocks 16 and 17. These conductors 21 extend through an elongated closed channel 22, the latter being fixedly but releasably connected to the underside of the bottom frame rail 12.

A raceway 26 is defined along the horizontally extending lower edge of the panel 11 so as to enclose the power system 14 therein. The raceway 26 is formed by a pair of substantially identical side covers 27 which cooperate with one another and with the bottom rail 12 to define a closed channel 29 substantially as illustrated in FIG. 4. These covers 27 are, in the illustrated embodiment, formed substantially as an integral upwardly opening channel having tabs 28 at the upper ends for fixedly but releasably securing the channel to the panel, which tabs can be released so that either cover can be flexed outwardly and downwardly to provide access to the channel 29, which channel accommodates communication cables and the like.

Figure 5:
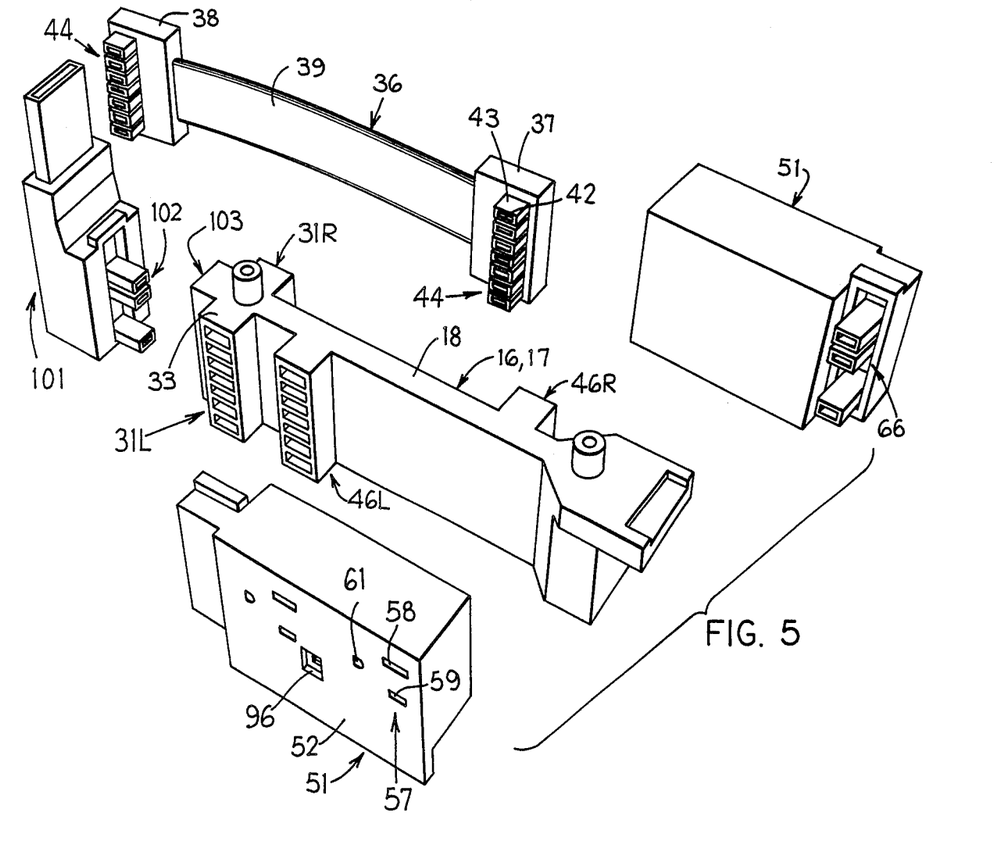
FIG. 5 is a perspective view illustrating the primary components which make up the electrical system.

Each power block 16 and 17 has a pair of identical connector portions 31 associated therewith, which portions face outwardly toward opposite sides of the power block and are identified as 31R and 31L for purposes of identification. The pair of connector portions 31 are disposed adjacent the outer end of the power block so as to be located closely adjacent the respective side edge of the panel. Each connector portion 31 includes a set of seven conductive blades or prongs 32 which project sidewardly of the power block. The seven prongs 32 are designated as 32-1 through 32-7 and are electrically and integrally joined to the conductive plates 19-1 through 19-7, respectively. Each conductive blade or prong 32 is suitably surrounded by a protective shroud 33 which effectively comprises a tubular sidewall of rectangular configuration. The shrouds associated with the seven conductors 32 are effectively integrally joined together as illustrated by FIGS. 2 and 5. These shrouds 33 extend outwardly slightly beyond the free ends of the conductors 32 to prevent accidental human contact therewith.

The three conductive plates 19-1 through 19-3, and the associated blades 32-1 through 32-3, define the three "live" conductors, whereas the three conductive plates 19-5 through 19-7 and the associated blades 32-5 through 32-7 define the three "neutral" conductors, one each of the latter being dedicated for association with a selected one of the "live" conductors. The remaining conductive plate 19-4, and its blade 32-4, functions as the ground.

To electrically interconnect adjacent panels such as 11 and 11A, the adjacent power blocks (such as the power block 16 on panel 11 and the adjacent power block on panel 11A) are electrically joined by a flexible electrical connector 36 as indicated in FIGS. 2 and 5. This connector 36 includes a pair of rigid insulative housing parts 37 and 38 which are joined together by an intermediate flexible hinge portion 39, the latter being effectively formed as a substantially flat but flexible strap which can be readily hinged in a horizontal plane so as to accommodate and permit the desired angular relationship between adjacent serially connected panels. A plurality, here seven, of electrical wires extend through the hinge part 36 and terminate in a plurality, here seven, of electrical conductors 41 (FIG. 2) as associated with each housing part 37-38. Each of these conductors 41 has a pronglike conductive contact 42 (FIG. 5) which projects sidewardly of the housing, with the seven contacts 42 being vertically spaced apart and individually surrounded by a substantially rectangular sleevelike shroud 43. The contacts 42 and surrounding shrouds 43 define a plug-in connector portion 44 which is designed to plug into the connector portions 31 to electrically connect the seven-wire system from panel to panel. This flexible connector 36 can be plugged into the connectors 31 of adjacent power blocks from either side of the serially-connected panels, and two such connectors can be plugged into opposite sides of a single power block to permit a single panel to be electrically joined to two adjacent panels to form a "T" or "Y" connection. The connectors 36 are positioned directly under and substantially between the panel sidewalls.

Each power block 16-17 also has a further pair of connector portions 46 (designated 46R and 46L for identification purposes) associated with the opposite sides thereof, which connector portions are identical but are longitudinally staggered or offset relative to one another. Each connector portion 46 includes a set of seven vertically spaced conductive prongs or contacts 47-1 through 47-7 projecting outwardly from the side of the power block housing, which contacts are integral with and respectively associated with the conductive plates 19-1 through 19-7. Each contact 47 is surrounded by a sleevelike shroud 48 which is of a substantially rectangular tubular cross section. The shrouds 48 of the seven contacts 47 have the sidewalls thereof vertically merged together, and the shrouds share a common horizontal wall as located between vertically adjacent contacts substantially as illustrated by FIG. 2, whereby the shroud on the connector portion 46 is identical to that associated with the connector portion 31. Each power block 16-17 defines a substantially flat vertical sidewall 49 which extends horizontally along the power block for a substantial distance directly adjacent the connector portion 46, which sidewall 49 is spaced inwardly a substantial distance from the side cover 27 so as to define a substantial region therebetween for accommodating a power-tap unit, such as a receptacle unit, as explained hereinafter.

Figure 3:
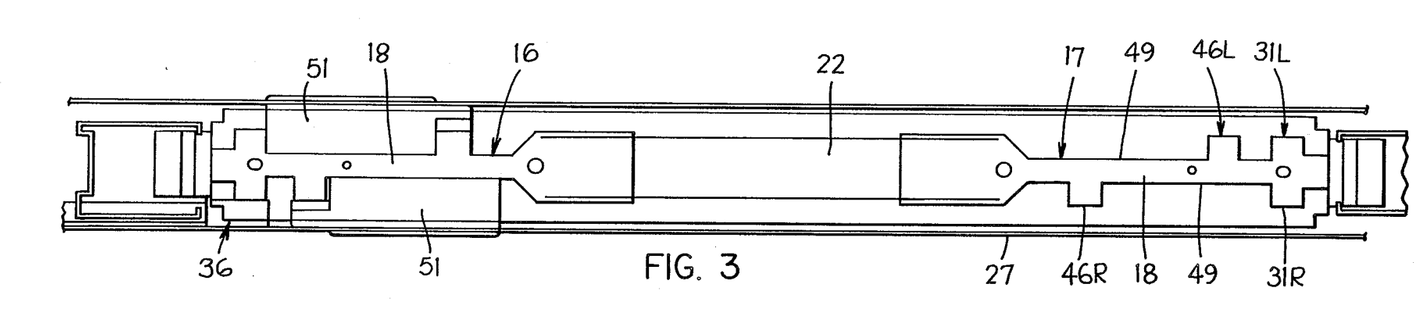
FIG. 3 is a top view of the electrical raceway structure of FIG. 2.

Referring now to FIG. 5, there is illustrated a power-tap unit 51 of this invention, specifically a receptacle unit, which can be plugged into one or both sides of each power block 16 and 17, whereby receptacle units can be positioned along the wall system at desired locations on either side thereof. This receptacle unit 51, as illustrated by FIGS. 2 and 3, is positionable within the raceway passage 29 directly adjacent the power block sidewall 49. The receptacle unit 51 plugs into one of the connector portions 46, whereby the front face 52 of the receptacle unit is disposed substantially flush with the outer surface of the side cover 27. For this purpose, the side cover 27 is provided with a substantially rectangular opening 53 (FIG. 1) for accommodating receptacle unit, which opening, 53 normally has a removable cover portion 54 (FIG. 1) disposed therein when the receptacle unit is not utilized.

This receptacle unit 51 (FIGS. 5–9) includes a hollow blocklike housing 56 constructed of a non-conductive material and having at least one outlet portion 57 formed in the front wall 52 thereof. This outlet portion 57, in the illustrated embodiment, comprises two conventional three-hole outlets or socket-type receptacles, each of which is defined in a conventional manner by a pair of vertical slots 58 and 59 and an associated U-shaped ground slot 61 so as to accommodate any conventional two-prong or three-prong plug. While the outlet or receptacle 57 is illustrated in a configuration consistent with standards utilized throughout the United States, it will be recognized that the receptacle or outlet 57 could also have a configuration corresponding to the standard receptacle utilized in other foreign countries such as the European countries.

The housing 56 mounts therein first and second platelike conductive members 62 and 63 for defining the conductive slots 58 and 59, respectively, and a third platelike conductive member 64 for defining the U-shaped ground slot 61.

Figures 7, 8:
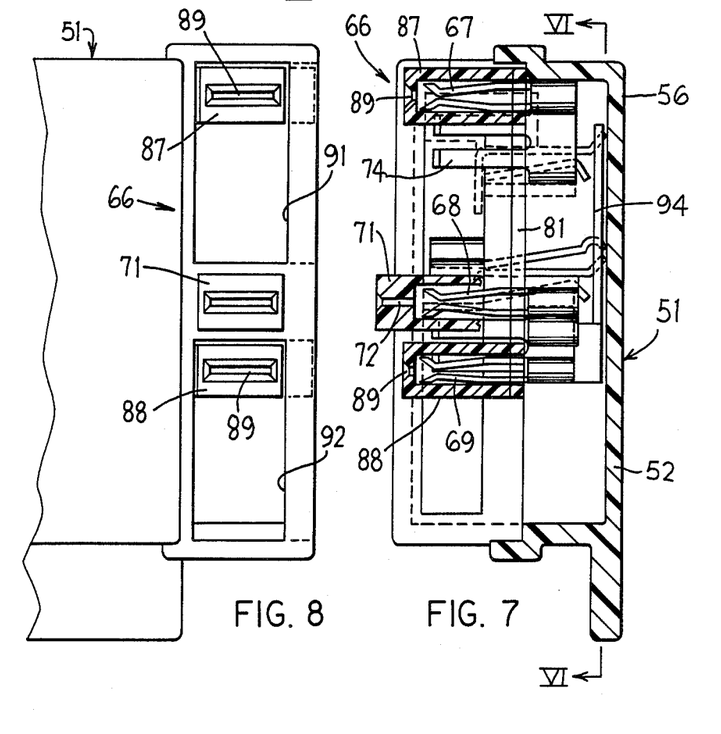
FIG. 7 is a sectional view taken substantially along line VII—VII in FIG. 6.
FIG. 8 is a fragmentary elevational view illustrating the rear side of the power-tap.

The receptacle unit 51 also has an input connector portion 66 which projects rearwardly therefrom for creating a plug-in electrical connection with the connector portion 46 associated with one of the power blocks. This input connector portion 66 includes three rearwardly projecting pronglike conductive contacts 67-68-69. Each of these contacts 67-68-69 is, as illustrated by FIG. 7, preferably formed by a pair of opposed plate portions which are sprung toward one another to hence form a narrow gap which slidingly and conductively receives therein one of the pronglike contacts 47.

The contact 68 is disposed vertically between the contacts 67 and 69 and is formed as an, integral part of the ground-defining conductive member 64. This contact 68 is hence designed for slidable engagement with the contact 47-4 since it defines the "ground" for the electrical system. The ground contact 68 is surrounded by a tubular shroud 71 which projects rearwardly from the housing and has a cross-sectional configuration which enables this shroud 71 to snugly slidably interfit within the shroud 48 associated with the connector portion 47. This shroud 71 is fixed, here integrally, to the housing 56 and has a narrow slot 72 opening inwardly through the rearward free end thereof for permitting insertion of the contact 47-4.

Figure 9:
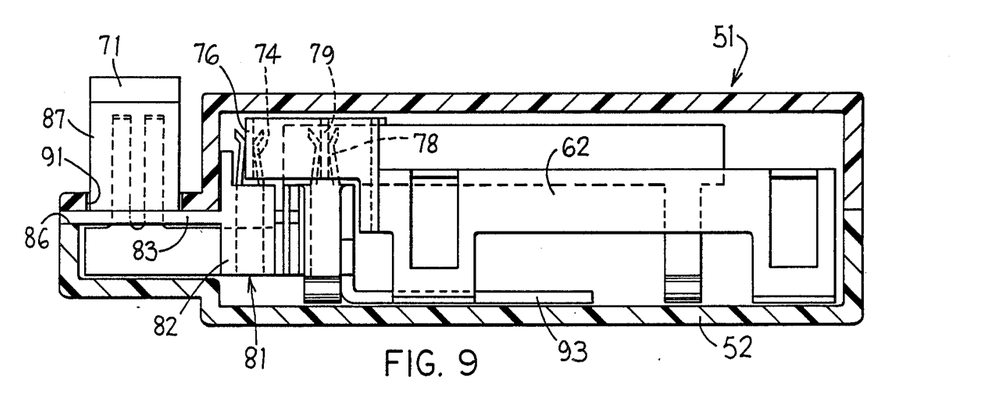
FIG. 9 is a sectional view taken substantially along line IX—IX in FIG. 6.

Considering now the contact 67, same is an integral part of a platelike conductive member 73 which has the contact 67 formed on one end thereof, and is provided with a similar contact 74 provided on the other end thereof. This latter contact 74, as shown in FIG. 9 is also formed by a pair of opposed spring plates which define therebetween a vertically oriented slot in which is slidably accommodated a conductive platelike part 76 which projects downwardly to form a slidable support. Part 76 is integral with the conductive plate 62.

The other contact 69 is similarly formed as part of a conductive plate 77 which also has a further contact 78 formed on the other end thereof, the latter defining (as shown in FIG. 9) a vertical slot in which is slidably accommodated a conductive platelike part 79 which also projects downwardly and is an integral part of the conductive plate 63.

The contacts 67 and 69, and their respective conductive plates or members 73 and 77, are hence maintained in respective electrical contact with the conductive plates 62 and 63 but are slidably supported for vertical movement relative thereto.

To confine the contacts 67 and 69 for synchronous vertical slidable movement relative to the power-tap housing, there is provided a carrier 81 which is constructed of an insulative material and is confined within the hollow housing 56 for vertical slidable displacement. This carrier 81 has a substantially sidewardly opening channel-shaped configuration and includes a main vertically extending body part 82 which has sidewardly projecting leg portions 83 and 84 adjacent the upper and lower ends thereof. These latter leg portions, adjacent the free ends thereof, are slidably vertically guided within aligned vertical slots 86 which open outwardly through an end wall of the housing 56. Each of these leg portions 83 and 84 has a tubular protective shroud 87 and 88 (FIGS. 6–8) respectively formed thereon and projecting rearwardly of the power-tap unit. These shrouds 87 and 88 respectively surround the contacts 67 and 69, and each has a slot 89 opening inwardly through the rearward free end thereof for permitting one of the prongs 47 to project therethrough for conductive engagement with the respective contact. These shrouds 87 and 88 project rearwardly of the housing through respective vertically elongated guide slots 91 and 92, which guide slots project vertically on opposite sides of the ground shroud 71 and, in conjunction with the slots 86, slidably vertical confine and guide the carrier 81. The carrier 81 also has channel-like shrouds 85 and 86 which respectively enclose the contacts 74 and 78. Slidable displacement (vertically in FIGS. 6–8) of the carrier 81 causes a corresponding displacement of the contacts 67 and 69, the latter being permitted due to the slidable engagement of the contacts 74 and 78 on the conductive plate parts 76 and 79, respectively.

Figure 6:
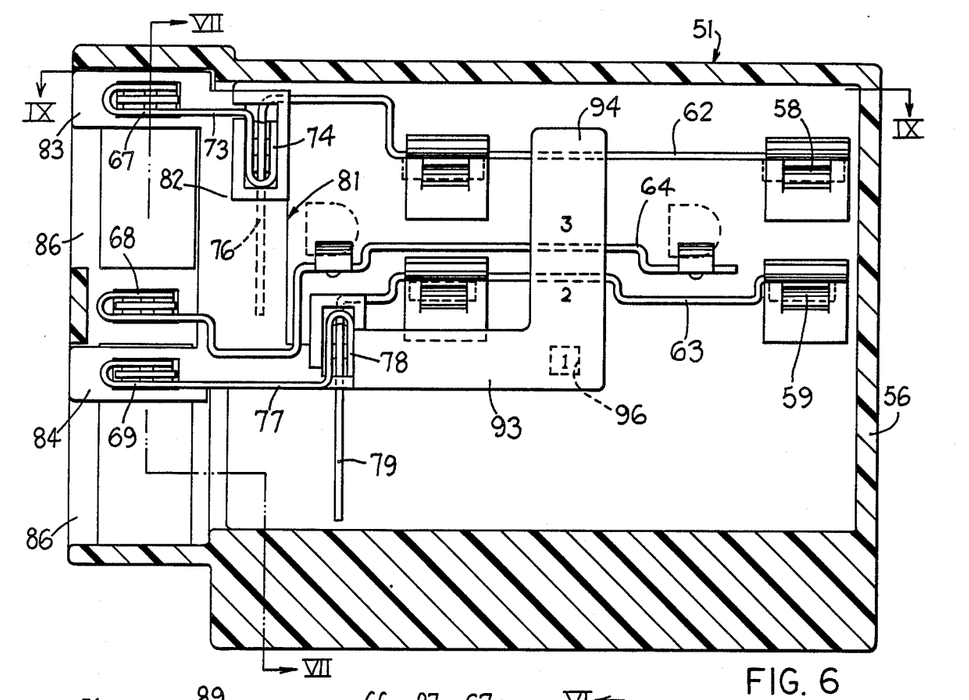
FIG. 6 is an enlarged front elevational view of the power-tap unit, specifically a receptacle unit, as taken substantially along line VI—VI in FIG. 7.

The carrier 81 also mounts an indicator 93 thereon, the latter being a substantially L-shaped plate which is fixed on the carrier 81 and projects inwardly of the power-tap housing so as to be positioned directly behind the front wall 52. This indicator plate 93 has, as illustrated in FIG. 6, a vertically projecting part 94 provided with indicia thereon, such as the numerals "1", "2" and "3" disposed in vertically spaced relation. These indicia are intended to indicate the three electrical circuits provided by the system, and depending upon the vertical position of the carrier 81, one of these indicia is adapted to be disposed directly behind a small window 96 as provided in the front face 52 so as to visually indicate the circuit to which the power-tap is adapted to be connected.

The use and circuit-selecting capability of the receptacle unit 51 will now be briefly described.

Assuming that it is desired to connect the receptacle unit 51 to circuit "1", then the carrier 81 will be slidably moved into the uppermost position illustrated by FIGS.

6-8. When so positioned, the receptacle unit is then plugged into a respective one of the connector portions 46. To effect this plug-in connection of the power-tap unit to the power block, the shrouds 71, 87 and 88 on the power-tap unit slidably telescope into the shrouds 48 on the connector 46. When in this circuit "1" position, the "live" connector 47-1 engages the contact 67, the "neutral" contact 47-5 engages the contact 69, and the "ground" contact 47-4 engages the contact 68.

Similarly, if circuit "3" is desired, then the carrier 81 is slidably moved downwardly into its lowermost position. In this case, the contacts 47-3 and 47-7 will now respectively engage the contacts 67 and 69, whereas the ground contact 47-4 will still engage the contact 68.

When circuit "2" is desired, the carrier is moved into an intermediate position which is midway between the upper and lower positions described above, and the power-tap is plugged into the power block in the same manner described above, whereupon the contacts 47-2 and 47-6 now respectively engage the contacts 67 and 69.

The shroud 71 associated with the ground contact 68 is, as illustrated by FIG. 7, of slightly greater length so as to project outwardly a significant distance beyond the free ends of the shrouds 87 and 88. Hence, the shroud 71 associated with the ground contact is thus utilized to initially position the power-tap unit relative to the connector portion 46, and in fact the tip end of this shroud 71 is slidably inserted into the shroud associated with the ground contact 47-4 so as to initially permit proper positioning of the power-tap during the plugging in thereof to the power block.

With the arrangement of the present invention as described above, both the "live" and "neutral" conductors associated with the power-tap unit can hence be synchronously shifted between three different positions to permit selection of a single circuit associated with the wall system, while at the same time the selected circuit possesses a dedicated "neutral" to avoid generation of undesired noise or interference.

While the invention described above relates specifically to a power-tap unit formed as a receptacle unit, it will be appreciated that this power-tap could also be of other forms, such as a connector for a panel mounted light fixture or other electrical device. In this regard, FIG. 5 illustrates a variation of a power-tap 101 having a connector portion 102 associated therewith, which connector portion 102 is constructed identically to that of the connector portion 66 associated with the receptacle unit 51 so that the upper and lower contacts are disposed within shrouds mounted on a common carrier so that the upper and lower contacts can be slidably displaced vertically between three different positions to permit selection between the three circuits. The centermost contact and its shroud are fixedly positioned. This connector portion 102 is adapted to plug into a further connector portion 103 which is formed on the end of the power block, this latter connector portion 103 being identical to the connector portion 46 and having seven contacts which are respectively integrally associated with the conductive plates disposed within the power block. This power-tap 101 has the electrical wires projecting upwardly therefrom so as to extend through one of the rails 12 or 12' for connection to a light fixture, such as fixture 104 (FIG. 1).

To supply power to the wall system, a conventional ceiling-type or base feed unit extends from a power monument and plugs into one of the power blocks 16 or 17. If a base feed unit is utilized, then it plugs into one of the connectors 46, whereas a ceiling feed unit will plug into the connector 103. The base or ceiling feed units are obviously seven-contact units so as to be in electrically conductive engagement with the seven conductive plates mounted within the power block. This general arrangement is conventional so that further description thereof is believed unnecessary.

While the preferred embodiment of the invention, as described above, discloses the movable contacts 67 and 69 in slidable engagement with the respective conductor plates 62 and 63, it will be appreciated that other types of connections, such as a hinged or flexing type pivotal connection, could also be utilized so long as the connection permits the necessary vertical displacement of the contacts 67 and 69.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright wall panel having an electrical power block means fixedly mounted thereon and disposed between a pair of substantially parallel vertical planes as defined by opposite side surface of the panel, said panel also having an electrical cable means associated therewith and disposed between said parallel planes and connected to said power block means, said power block means having a first connector portion associated therewith and electrically joined to said cable means, and a small portable electrical power-tap unit releasably joined to said first connector portion, said power-tap unit having an inlet portion for electrical connection to said power block means and an outlet portion defining a single electrical circuit adapted for supply of electrical energy to a circuit or device disposed externally of the panel, the outlet portion comprising a receptacle having first, second and third prong-receiving openings, the improvement comprising:

said cable means and said power block means defining a multiple-conductor system including at least three separate live conductors three separate neutral conductors and one ground conductor for defining (1) a first electrical circuit defined by a first said live conductor and a first said neutral conductor, (2) a second electrical circuit defined by a second said live conductor and a second said neutral conductor, and (3) a third electrical circuit defined by a third said live conductor and a third said neutral conductor;

said first connector portion having (1) three live electrical conductor parts which are respectively joined to said three live conductors, (2) three neutral electrical conductor parts which are respectively joined to said three neutral conductors, and (3) a ground conductor part joined to said ground conductor;

said power-tap unit including a housing having first, second and third conductive members mounted therein and each having means defining one of the prong-receiving openings of said receptacle;

said inlet portion of said power-tap unit being defined by a second connector portion which creates a plug-type engagement with said first connector portion to physically and electrically couple said power-tap unit to said power block means;

said second connector portion including three electrical contacts disposed for engagement with selected ones of the conductor parts of said first connector portion to permit said power-tap unit to be electrically connected to only a single said circuit as associated with said power block means, a first said electrical contact being selectively engageable with any one, but only one at any one time, of said three live conductor parts, a second said electrical contact being engageable with any one, but only one at any one time, of said three neutral conductor parts, and said third electrical contact being engageable solely with said ground conductor part;

means associated with said second connector portion for causing simultaneous shifting of said first and second electrical contacts between first, second and third positions relative to said housing to permit said first and second electrical contacts to be electrically joined to said first, second and third electrical circuits respectively as defined by said power block means; and electrically conductive means joined between said first and second conductive members and said first and second electrical contacts, respectively, or permitting relative movement therebetween to accommodate the movement of said first and second electrical contacts between said positions.

2. A wall panel according to claim 1, wherein said first, second and third electrical contacts project outwardly of said unit toward said power block means, said third electrical contact being disposed between said first and second electrical contacts, and said shifting means including an insulative carrier slidably mounted on said unit housing for slidable displacement between said first, second and third positions, said carrier having said first and second electrical contacts mounted thereon.

3. A wall panel according to claim 1, wherein said shifting means includes an insulative carrier slidably mounted on said unit housing for slidable displacement between said first, second and third positions, said carrier having said first and second electrical contacts mounted thereon for synchronous displacement thereof relative to said third electrical contact into a selected one of said positions.

4. A wall panel according to claim 3, wherein said housing has a first wall defining therein small openings which are aligned with the prong-receiving openings of said receptacle, and wherein said housing has a second wall spaced from said first wall and through which project outwardly said first, second and third electrical contacts, said second wall having elongated slot means formed therein through which project said first and second electrical contacts for accommodating the displacement of said first and second electrical contacts between said first, second and third positions.

5. A small portable electrical power-tap unit adapted to be releasably coupled both physically and electrically to an electrical terminal by means of a pluglike connection, the terminal having multiple conductors associated therewith defining at least first and second electrical circuits each having separate live and neutral conductors, said power-tap unit comprising:

a blocklike housing of electrically insulative material defining a hollow interior therein;

first, second and third conductive members mounted within said hollow interior in electrically spaced relationship and having conductor parts which define three individual pronglike receptacles associated with a three-hole electrical socket, said housing having three openings formed in one wall thereof in alignment with said conductor parts for defining said three-hole socket for permitting supply of electrical energy to a circuit or device disposed externally of the unit;

a pluglike connector portion associated with a further wall of said housing for permitting said unit to be physically and electrically coupled to the terminal by means of a pluglike connection;

said connector portion including first, second and third electrical contacts which are adapted to create releasable electrical engagement with the terminal, said first and second electrical contacts being movably supported on said housing within the hollow interior thereof and projecting outwardly therefrom, said third electrical contact being fixedly supported within said housing and projecting outwardly therefrom;

carrier means of an electrically insulative material slidably supported on said housing and having said first and second electrical contacts stationarily mounted thereof for permitting said first and second contacts to be synchronously moved relative to said third electrical contact between at least first and second positions which permit the power-tap unit to be coupled to the terminal for connection to different electrical circuits;

electrically conductive means connecting said first and second electrical contacts to said first and second conductive members, respectively, for permitting relative movement therebetween as said first and second electrical contacts more between said first and second positions, said third electrical contact being electrically connected to said third conductive member;

said carrier means being movably supported on said housing for slidable displacement in a direction which is substantially perpendicular to the outwardly projecting direction of the electrical contacts;

said further wall or said housing having elongated slot means formed therein through which project said first and second electrical contacts for permitting said contacts to be displaced along said slot means between said first and second positions; and said carrier means having fixedly associated therewith first and second shroudlike parts which are also of electrically insulative material and are disposed in surrounding relationship to the first and second electrical contacts respectively, said first and second shroudlike parts projecting outwardly through said slot means and being transversely slidably displaceable therealong between said first and second positions.

6. A power-tap unit according to claim 5, wherein said housing has a tubelike shroud fixed to said further wall and projecting outwardly therefrom in surrounding relationship to said third electrical contact, said shroud projecting outwardly through a greater extent than said first and second shroudlike portions so as to act as a pilot when the power-tap unit is plugged into the terminal.

7. In an upright wall panel having an electrical power block means fixedly mounted thereon and disposed between a pair of substantially parallel vertical panels as defined by opposite side surfaces of the panel, said panel also having an electrical cable means associated therewith and disposed between said parallel planes and connected to said power block means, said power block means having a first connector portion associated therewith and electrically joined to said cable means, and a small portable electrical power-tap unit releasably joined to said first connector portion, said power-tap unit having an inlet portion for electrical connection to said power block means and an outlet portion defining a single electrical circuit adapted for supply of electrical energy to a circuit or device disposed externally of the panel, the outlet portion comprising a receptacle having first, second and third prong-receiving openings, the improvement comprising:

said cable means and said power block means defining at least a seven conductor system including at least three separate live conductors, three separate neutral conductors and one ground conductor for defining three different electrical circuits each having a different said neutral conductor, said first connector portion having seven electrical conductor parts which are respectively electrically joined to said seven conductors;

said power-tap unit including a housing having first, second and third conductive members mounted therein and each having means defining one of the prong-receiving openings of said receptacle;

said inlet portion of said power-tap unit being defined by a second connector portion which creates a plug-type engagement with said first connector portion to physically and electrically coupled said power-tap unit to said power block means;

said second connector portion including three electrical contacts disposed for engagement with selected one of the conductor parts of said first connector portion to permit said power-tap unit to be electrically connected to only a single said circuit as associated with power block means, a first said electrical contact being selectively engageable with any one, but only one at any one time, of said three live conductor parts, a second said electrical contact being engageable with any one, but only one at any one time, of said three neutral conductor parts, and said third electrical contact being engageable solely with said ground conductor part;

said first, second and third electrical contacts projecting outwardly of said unit toward said power block means, said third electrical contact being disposed between said first and second electrical contacts;

shifting means associated with said second connector portion for causing simultaneous shifting of said first and second electrical contacts between first, second and third positions relative to said unit housing to permit said first and second electrical contacts to be electrically joined to any selected one, but to only one at any one time, of the three circuits defined by said power block means;

electrically conductive means joined between said first and second conductive members and said first and second electrical contacts, respectively, for permitting relative movement therebetween to accommodate the movement of said first and second electrical contacts between said positions;

said shifting means including an insulative carrier slidably mounted on said unit housing for slidable displacement between said first, second and third positions, said carrier having said first and second electrical contacts mounted thereon for movement therewith;

said unit housing includes a tube-like protective shroud which projects outwardly and rearwardly thereof in surrounding relationship to said third electrical contact, said housing having a hollow interior and being provided with a pair of vertically elongated aligned slots opening through a rear wall thereof and disposed vertically on opposite sides of said protective shroud; and said carrier being slidably supported on said housing within said hollow interior and having a pair of rearwardly projecting shroudlike portions which individually slidably project outwardly through and are vertically slidably guided by said slots, each of said shroudlike portions having one of said first and second electrical contacts mounted therein.

8. A wall panel according to claim 7, wherein said first and second electrical contacts are fixedly associated with first and second conductive elements, respectively, which are mounted on and vertically slidably displaceable with said carrier, and said electrically conductive means including first and second contact portions fixedly associated with the first and second conductive elements, respectively, and disposed in slidable and electrical engagement with elongated platelike parts of said first and second conductive members, respectively.

9. A wall panel according to claim 7, wherein said first, second and third electrical contacts all comprise elongated pronglike elements which project in a rearward direction of said housing for engagement with selected ones of the conductor parts mounted on the terminal.

10. A wall panel according to claim 7, wherein the shroud surrounding the third electrical contact projects rearwardly through a distance greater than the shroudlike portions surrounding the first and second electrical contacts to function as a pilot for properly positioning and aligning the unit when it is plugged into the terminal.

11. In an upright wall panel having an electrical power block means fixedly mounted thereon and disposed between a pair of substantially parallel vertical planes as defined by opposite side surface of the panel, said panel also having an electrical cable means associated therewith and disposed between said parallel planes and connected to said power block means, said power block means having a first connector portion associated therewith and electrically joined to said cable means, and a small portable electrical power-tap unit releasably joined to said first connector portion, said power-tap unit having an inlet portion for electrical connection to said power block means and an outlet portion defining a single electrical circuit adapted for supply of electrical energy to a circuit or device disposed externally of the panel, the outlet portion comprising a receptacle having first, second and third prong-receiving openings, the improvement comprising:

said cable means and said power block means defining a multiple conductor system having seven conductors including at least three separate live conductors, three separate neutral conductors and one ground conductor for defining three different electrical circuits each having a different said neutral conductors, said first connector portion having seven electrical conductor part which are respectively electrically joined to said seven conductors;

said power-tap unit including a housing having first, second and third conductive members mounted therein and each having means defining one of the prong-receiving openings of said receptacle;

said inlet portion of said power-tap unit being defined by a second connector portion which creates a plug-type engagement with said first connector portion to physically and electrically couple said power-tap unit to said power block means;

said second connector portion including three electrical contacts disposed for engagement with selected ones of the conductor parts of said first connector portion to permit said power-tap unit to be electrically connected to only a signal said circuit as associated with said power block means, a first said electrical contact being selectively engageable with any one, but only one at any one time, of said three live conductor parts, a second said electrical contact being engageable with any one, but only one at any one time, of said three neutral conductor parts, and said third electrical contact being engageable solely with said ground conductor part;

means associated with said second connector portion for causing simultaneous shifting of said first and second electrical contacts between first, second and third positions relative to said housing to permit said first and second electrical contacts to be electrically joined to any selected one, but to only one at any one time, of the three circuits defined by said power block means;

electrically conductive means joined between said first and second conductive members and said first and second electrical contacts, respectively, for permitting relative movement therebetween to accommodate the movement of said first and second electrical contacts between said positions;

said shifting means includes an insulative carrier movably mounted on said housing for displacement between said first, second and third positions, said carrier having said first and second electrical contacts mounted thereon for synchronous displacement thereof relative to said third electrical contact into a selected one of said positions;

said housing having a first wall defining therein small openings which are aligned with the prong-receiving openings of said receptacle, and said housing having a second wall spaced from said first wall and through which project outwardly said first, second and third electrical contacts, said second wall having elongated slot means formed therein through which project said first and second electrical contacts for accommodating the displacement of said first and second electrical contacts between said first, second and third positions; and said carrier including thereon outwardly projecting shroud-like portions which project outwardly through said slot means and are slidably guided thereby, each of said shroudlike portions having one of said first and second electrical contacts mounted therein.

12. A wall panel according to claim 11, wherein said unit housing has a tubelike protective shroud which projects outwardly from said second wall in surrounding relationship to said third electrical contact, said shroud projecting outwardly through a distance greater than the shroudlike portions so as to function as a pilot for properly positioning and aligning the unit when it is plugged into the terminal.

* * * * *

UNITED STATES PATENT AND TRADEMARK OFFICE
CERTIFICATE OF CORRECTION

PATENT NO. : 4,781,609

DATED : November 1, 1988

INVENTOR(S) : Harold R. WILSON et al

It is certified that error appears in the above-identified patent and that said Letters Patent is hereby corrected as shown below:

Column 8, line 46; change "conductors" to ---conductors,---.

Column 10, line 35; change "more" to ---move---.

Column 10, line 68; change "panels" to ---planes---.

Column 11, line 32; change "coupled" to ---couple---.

Column 11, line 36; change "one" to ---ones---.

Signed and Sealed this

Twenty-second Day of August, 1989

Attest:

DONALD J. QUIGG

*Attesting Officer*　　　*Commissioner of Patents and Trademarks*